(12) United States Patent
Han et al.

(10) Patent No.: US 10,505,936 B2
(45) Date of Patent: Dec. 10, 2019

(54) ACCESS CONTROL DEVICE AND AUTHENTICATION CONTROL METHOD

(71) Applicant: Huawei Technologies Co., Ltd., Shenzhen (CN)

(72) Inventors: Zhichong Han, Nanjing (CN); Bin Yu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 15/254,451

(22) Filed: Sep. 1, 2016

(65) Prior Publication Data
US 2017/0063863 A1 Mar. 2, 2017

(30) Foreign Application Priority Data
Sep. 2, 2015 (CN) .......................... 2015 1 0556295

(51) Int. Cl.
*G06F 7/04* (2006.01)
*H04L 29/06* (2006.01)
(Continued)

(52) U.S. Cl.
CPC .......... *H04L 63/101* (2013.01); *H04L 63/083* (2013.01); *H04L 63/0876* (2013.01);
(Continued)

(58) Field of Classification Search
CPC . H04L 63/083; H04L 63/0876; H04L 63/101; H04L 63/1458; H04W 12/06; H04W 12/08; H04W 12/12
(Continued)

(56) References Cited

U.S. PATENT DOCUMENTS 7,672,283 B1\* 3/2010 Chang ................... H04W 12/12
370/338
8,284,665 B1\* 10/2012 Aybay ................... H04L 43/026
370/235

(Continued)

FOREIGN PATENT DOCUMENTS

JP 2006527967 A 12/2006
JP 2007189512 A 7/2007

OTHER PUBLICATIONS

Heinanen, J., et al., "A Single Rate Three Color Marker," RFC 2697, Sep. 1999, 6 pages.
(Continued)

*Primary Examiner* — Gary S Gracia
(74) *Attorney, Agent, or Firm* — Conley Rose, P.C.

(57) ABSTRACT

An access control device and an authentication control method, where the method includes detecting whether a packet that arrives at an access control device is an authentication start packet, where the authentication start packet is used to start an authentication process of a terminal that sends the authentication start packet, and restricting a rate at which the access control device receives an authentication start packet. It is detected whether the packet that arrives at the access control device is an authentication start packet, and the rate at which the access control device receives the authentication start packet is restricted. The rate at which the authentication start packet is received is restricted to control a quantity of terminals that enter subsequent authentication, which avoids an avalanche effect of wireless authentication caused when an excessively large quantity of terminals enter subsequent authentication simultaneously.

20 Claims, 6 Drawing Sheets

Detect whether a packet that arrives at an access control device is an authentication start packet, where the authentication start packet is used to start an authentication process of a terminal that sends the authentication start packet — 201

Restrict a rate at which the access control device receives an authentication start packet — 202

(51) Int. Cl.
*H04W 12/12* (2009.01)
*G06F 15/16* (2006.01)
*H04W 12/06* (2009.01)
*H04W 12/08* (2009.01)

(52) U.S. Cl.
CPC ......... *H04L 63/1458* (2013.01); *H04W 12/12* (2013.01); *H04W 12/06* (2013.01); *H04W 12/08* (2013.01)

(58) Field of Classification Search
USPC .................. 726/2, 4, 13; 370/235, 338, 342
See application file for complete search history.

(56) References Cited

U.S. PATENT DOCUMENTS

| | | | |
|---|---|---|---|
| 8,613,089 B1 | 12/2013 | Holloway et al. | |
| 8,675,717 B1* | 3/2014 | Yuan | H04L 1/0002 375/219 |
| 9,356,968 B1* | 5/2016 | Dotan | H04L 63/20 |
| 9,875,344 B1* | 1/2018 | Hughes | G06F 21/12 |
| 2003/0226017 A1* | 12/2003 | Palekar | H04L 63/0428 713/168 |
| 2006/0185013 A1 | 8/2006 | Oyama et al. | |
| 2006/0282880 A1 | 12/2006 | Haverinen et al. | |
| 2007/0133413 A1* | 6/2007 | Pepperell | H04L 12/18 370/235 |
| 2007/0165633 A1 | 7/2007 | Ikegami et al. | |
| 2007/0212071 A1* | 9/2007 | Guo | H04L 47/10 398/69 |
| 2008/0049705 A1* | 2/2008 | Huang | H04L 29/06027 370/342 |
| 2009/0089409 A1* | 4/2009 | Pasko | H04L 63/08 709/223 |
| 2009/0183252 A1* | 7/2009 | Nomi | H04L 63/08 726/13 |
| 2009/0300759 A1 | 12/2009 | Wang et al. | |
| 2010/0146262 A1* | 6/2010 | Zhang | H04W 12/06 713/155 |
| 2010/0194528 A1* | 8/2010 | Yamaguchi | G06F 21/629 340/5.8 |
| 2011/0286025 A1* | 11/2011 | Silverbrook | B41J 3/445 358/1.14 |
| 2012/0057063 A1 | 3/2012 | Wang et al. | |
| 2012/0155268 A1* | 6/2012 | Ohshio | H04L 47/12 370/235 |
| 2014/0020059 A1* | 1/2014 | Miyamoto | H04W 4/21 726/2 |
| 2015/0012998 A1 | 1/2015 | Nellikar et al. | |
| 2015/0089621 A1* | 3/2015 | Khalid | H04L 63/08 726/9 |
| 2015/0281201 A1* | 10/2015 | Mehr | G06K 9/00926 382/115 |
| 2016/0140570 A1* | 5/2016 | Rivlin | G06Q 10/08 705/317 |
| 2016/0295497 A1* | 10/2016 | Calcev | H04L 43/10 |
| 2017/0093794 A1* | 3/2017 | Natu | H04L 12/4641 |

OTHER PUBLICATIONS

Heinanen, J., et al., "A Two Rate Three Color Marker," RFC 2698, Sep. 1999, 5 pages.
Aboba, B., et al., "PPP EAP TLS Authentication Protocol," RFC 2716, Oct. 1999, 29 pages.
Aboba, B., et al., "Extensible Authentication Protocol (EAP)," RFC 3748, Jun. 2004, 67 pages.
"Port-Based Network Access Control," IEEE Computer Society, 802.1X, Feb. 5, 2010, 222 pages.
Foreign Communication Form a Counterpart Application, European Application No. 16186714.8, Extended European Search Report dated Dec. 13, 2016, 7 pages.
Nasuno, Y., et al., "The Second Power-Up Course, The Sequel of Network Design Technique in Layer 3 Switching Age," Nikkei Network, Japan, Nikkei BP Company, Oct. 22, 2006, vol. 79, pp. 160-167.
English Translation of Nasuno, Y., et al., "The Second Power-Up Course, The Sequel of Network Design Technique in Layer 3 Switching Age," Nikkei Network, Japan, Nikkei BP Company, Oct. 22, 2006, vol. 79, 4 pages.
Naito, S., et al., "User Authentication Using a Radius Server in a Wireless LAN," Collection of the 65th (2003) National Convention Lecture Papers (3), Japan, Information Processing Society of Japan, Mar. 25, 2003, 1V-1, 2 pages.
English Translation of Naito, S., et al., "User Authentication Using a Radius Server in a Wireless LAN," Collection of the 65th (2003) National Convention Lecture Papers (3), Japan, Information Processing Society of Japan, Mar. 25, 2003, 1V-1, 1 page.
Foreign Communication From a Counterpart Application, Japanese Application No. 2016-170600, Japanese Office Action dated Nov. 28, 2017, 5 pages.
Foreign Communication From a Counterpart Application, Japanese Application No. 2016-170600, English Translation of Japanese Office Action dated Nov. 28, 2017, 6 pages.
Foreign Communication From A Counterpart Application, Indian Application No. 201634029597, Indian Office Action dated Sep. 30, 2019, 7 pages.

* cited by examiner

ACCESS CONTROL DEVICE AND AUTHENTICATION CONTROL METHOD

CROSS-REFERENCE TO RELATED APPLICATION

This patent application claims priority to Chinese patent application number 201510556295.5 filed on Sep. 2, 2015, which is incorporated by reference.

TECHNICAL FIELD

This application relates to the field of communications, and in particular, to an access control device and an authentication control method.

BACKGROUND

In wired or wireless communication, a terminal may need to perform access authentication with an authentication server using an access controller when the terminal is to be connected to a local area network. Because a processing capability of the access controller is limited, the access controller may be overloaded when a relatively large quantity of terminals perform access authentication simultaneously.

To prevent overload, the access controller may restrict a rate of a received authentication packet. For example, the access controller presets a rate of a received authentication packet to x, and discards another authentication packet that arrives when a total rate at which authentication packets of terminals are received reaches x. An authentication process of a terminal that sends the discarded authentication packet is interrupted. The terminal whose authentication process is interrupted may restart access authentication.

Authentication processes of a large quantity of terminals are interrupted if terminals that perform authentication are excessively concentrated within a period of time. The terminals whose authentication processes are interrupted may immediately restart authentication, and a rate of authentication packets is still very high. The situation in which a large quantity of terminals perform authentication in a concentrated manner continues, and interaction processes of other terminals are interrupted. This process repeats continuously, finally causing almost all users to be incapable of completing an entire authentication process. The foregoing phenomenon is called an avalanche effect of authentication, which affects system authentication efficiency.

SUMMARY

This application provides an authentication control method and an access control device to resolve a problem of an avalanche effect of authentication caused when terminals perform authentication in an excessively concentrated manner.

According to a first aspect, an access control device is provided, where the access control device includes a detection module configured to detect whether a packet that arrives at the access control device is an authentication start packet, where the authentication start packet is used to start an authentication process of a terminal that sends the authentication start packet, and a restriction module configured to restrict a rate at which the access control device receives an authentication start packet.

With reference to the first aspect, in a first possible implementation manner of the first aspect, the restriction module is configured to restrict the rate at which the access control device receives the authentication start packet, only when a packet reception state satisfies a first predetermined condition, where the first predetermined condition includes one of the following conditions a quantity of authentication packets that arrive at the access control device in a unit time is greater than a first threshold, a quantity of authentication packets that are discarded by the access control device in a unit time is greater than a second threshold, or a ratio of a quantity of authentication packets that are discarded by the access control device in a unit time to a quantity of authentication packets that arrive at the access control device in the unit time is greater than a third threshold.

With reference to the first aspect or the first possible implementation manner of the first aspect, in a second possible implementation manner of the first aspect, the restriction module is configured to restrict the rate at which the access control device receives the authentication start packet, only when a quantity of terminals that are successfully authenticated in the unit time using the access control device is greater than a fourth threshold.

With reference to the first aspect, the first possible implementation manner of the first aspect, or the second possible implementation manner of the first aspect, in a third possible implementation manner of the first aspect, the detection module is further configured to detect whether an authentication packet that arrives at the access control device satisfies a second predetermined condition, and determine that the authentication packet that arrives at the access control device is an authentication start packet if the authentication packet that arrives at the access control device satisfies the second predetermined condition, where the second predetermined condition is one of the following conditions a packet type field in an Extensible Authentication Protocol (EAP) packet is 1 when the authentication packet is the EAP packet, in the EAP packet, a packet type field is 0, a packet body type field is 2, and an authentication type field is 1 when the authentication packet is an EAP packet, in the authentication packet that arrives at the access control device, a ver field is 2, a type field is 1, and a chap field is 0 when the authentication packet is a Challenge Handshake Authentication Protocol (CHAP) packet, or in the authentication packet that arrives at the access control device, a ver field is 2, a type field is 3, and a pap field is 1 when the authentication packet is a Password Authentication Protocol (PAP) packet.

With reference to the first aspect or any one of the first to third possible implementation manners of the first aspect, in a fourth possible implementation manner of the first aspect, the access control device further includes a cancellation module configured to cancel the restriction performed by the restriction module on the rate at which the access control device receives the authentication start packet when a third predetermined condition is satisfied, where the third predetermined condition being satisfied includes one of the following: the quantity of authentication packets that arrive at the access control device in the unit time is less than a fifth threshold, where the fifth threshold is less than the first threshold, the quantity of authentication packets that are discarded by the access control device in the unit time is less than a sixth threshold, where the sixth threshold is less than the second threshold, or the ratio of the quantity of authentication packets that are discarded by the access control device in the unit time to the quantity of authentication packets that arrive at the access control device in the unit time is less than a seventh threshold, where the seventh threshold is less than the third threshold.

According to a second aspect, an authentication control method is provided, where the method includes detecting whether a packet that arrives at an access control device is an authentication start packet, where the authentication start packet is used to start an authentication process of a terminal that sends the authentication start packet, and restricting a rate at which the access control device receives an authentication start packet.

In a first possible implementation manner of the second aspect, restricting a rate at which the access control device receives an authentication start packet includes restricting the rate at which the access control device receives the authentication start packet, only when a packet reception state satisfies a first predetermined condition, where the first predetermined condition includes one of the following conditions: a quantity of authentication packets that arrive at the access control device in a unit time is greater than a first threshold, a quantity of authentication packets that are discarded by the access control device in a unit time is greater than a second threshold, or a ratio of a quantity of authentication packets that are discarded by the access control device in a unit time to a quantity of authentication packets that arrive at the access control device in the unit time is greater than a third threshold.

With reference to the second aspect or the first possible implementation manner of the second aspect, in a second possible implementation manner of the second aspect, restricting a rate at which the access control device receives an authentication start packet includes restricting the rate at which the access control device receives the authentication start packet, only when a quantity of terminals that are successfully authenticated in the unit time using the access control device is greater than a fourth threshold.

With reference to the second aspect, the first possible implementation manner of the second aspect, or the second possible implementation manner of the second aspect, in a third possible implementation manner of the second aspect, detecting whether a packet that arrives at an access control device is an authentication start packet includes detecting whether an authentication packet that arrives at the access control device satisfies a second predetermined condition, and determining that the authentication packet that arrives at the access control device is an authentication start packet if the authentication packet that arrives at the access control device satisfies the second predetermined condition, where the second predetermined condition is one of the following conditions: a packet type field in the EAP packet is 1 when the authentication packet is an EAP packet, in the EAP packet, a packet type field is 0, a packet body type field is 2, and an authentication type field is 1 when the authentication packet is an EAP packet, in the authentication packet that arrives at the access control device, a ver field is 2, a type field is 1, and a chap field is 0 when the authentication packet is a CHAP packet, or in the authentication packet that arrives at the access control device, a ver field is 2, a type field is 3, and a pap field is 1 when the authentication packet is a PAP packet.

With reference to the second aspect or any one of the first to third possible implementation manners of the second aspect, in a fourth possible implementation manner of the second aspect, the method further includes canceling the restriction on the rate at which the access control device receives the authentication start packet when a third predetermined condition is satisfied, where the third predetermined condition being satisfied includes one of the following: the quantity of authentication packets that arrive at the access control device in the unit time is less than a fifth threshold, where the fifth threshold is less than the first threshold, the quantity of authentication packets that are discarded by the access control device in the unit time is less than a sixth threshold, where the sixth threshold is less than the second threshold, or the ratio of the quantity of authentication packets that are discarded by the access control device in the unit time to the quantity of authentication packets that arrive at the access control device in the unit time is less than a seventh threshold, where the seventh threshold is less than the third threshold.

It is detected whether a packet that arrives at an access control device is an authentication start packet, and a rate at which the access control device receives an authentication start packet is restricted. The rate at which the authentication start packet is received is restricted to control a quantity of terminals that enter subsequent authentication, which avoids an avalanche effect of wireless authentication caused when an excessively large quantity of terminals enter subsequent authentication simultaneously, and ensures that a terminal that already performs subsequent access authentication currently can complete an entire authentication process smoothly, thereby achieving an effect of improving system authentication efficiency.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

Figure 1:
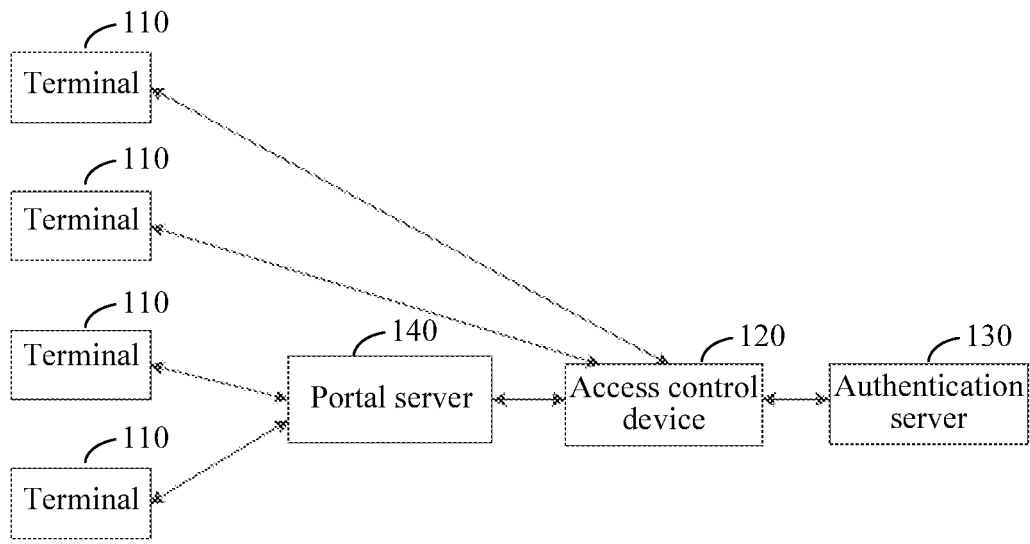
FIG. 1 is an architectural diagram of a network environment involved in the present disclosure.

Refer to FIG. 1, which shows an architectural diagram of a network environment involved in the present disclosure. The network includes the following network devices, a terminal 110, an access control device 120, and an authentication server 130. Optionally, the network environment may further include a portal server 140.

The access control device 120 is a network device configured to process an authentication packet between the terminal 110 and the authentication server 130. For example, the access control device 120 may be a dedicated access controller, or may be a network device (for example, a router or a network switch) integrated with a function of an access controller. The portal server 140 may be a personal computer, or may be a server web application server. The portal server includes software for captive portal authentication.

The access control device 120 is connected to the authentication server 130, and the portal server 140 is connected to the access control device 120.

There are mainly two manners for performing access authentication by the terminal 110. One is an EAP authentication manner, and the other is a captive portal authentication manner. The terminal 110 is connected to the access control device 120 when performing access authentication in the EAP authentication manner, and the terminal 110 is connected to the portal server 140 when performing access authentication in the captive portal authentication manner.

According to a solution shown in the embodiments of the present disclosure, a rate at which the access control device 120 receives an authentication start packet (that is, the first packet used to start an authentication process) is restricted to control a quantity of terminals that enter a subsequent authentication process in a unit time, which avoids an avalanche effect of wireless authentication caused when an excessively large quantity of terminals enter subsequent authentication simultaneously, and ensures that a terminal that already performs subsequent access authentication currently can complete an entire authentication process smoothly.

The rate of the authentication start packet may not be restricted when no avalanche effect occurs. Therefore, to reduce processing resources, in the solution shown in the embodiments of the present disclosure, a rate of an authentication start packet may be restricted only when a specific condition is satisfied when the authentication process of the terminal 110 is being controlled.

In one aspect, one or more of a quantity of authentication packets that arrive at the access control device 120, a quantity of lost authentication packets, and a packet loss rate of authentication packets may be monitored. It is considered that a condition for restricting the rate at which the authentication start packet is received is satisfied only when it is found, by monitoring, that in the unit time, the quantity of authentication packets that arrive at the access control device 120 is excessively large, the quantity of lost authentication packets is excessively large, or the packet loss rate of authentication packets is excessively high, and then, the rate at which the access control device 120 receives the authentication start packet is restricted.

In another aspect, a quantity of terminals that perform accessing successfully in the unit time decreases when an avalanche effect occurs in the authentication process. The quantity of terminals that perform accessing successfully in the unit time using the access control device 120 may also be monitored. The rate at which the access control device 120 receives the authentication start packet is restricted only when it is found, by monitoring, that the quantity of terminals that perform accessing successfully in the unit time using the access control device 120 is less than a threshold.

In order to improve accuracy of detection and reduce a probability of erroneous detection, the conditions in the foregoing two aspects may be combined, and the rate of the authentication start packet is restricted only when the two types (monitoring authentication packets and monitoring terminals that perform accessing successfully) of conditions are both satisfied.

Figure 2:
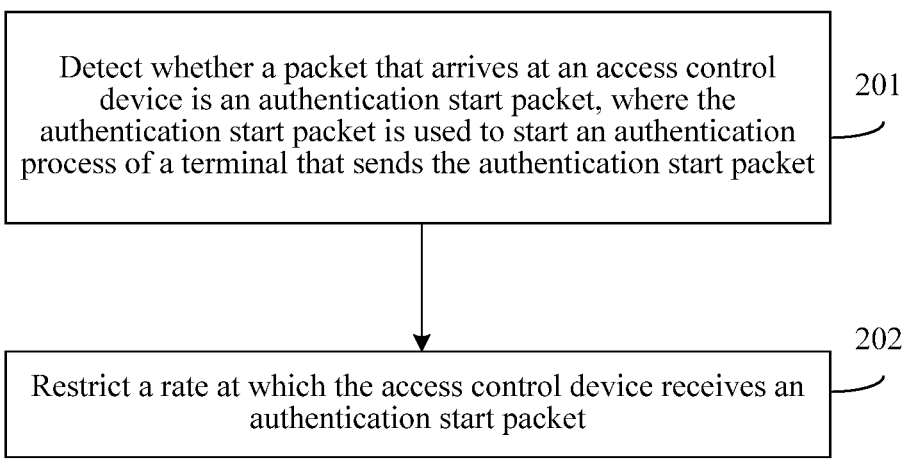
FIG. 2 is a method flowchart of an authentication control method according to an embodiment of the present disclosure.

Refer to FIG. 2, which shows a method flowchart of an authentication control method according to an embodiment of the present disclosure. The authentication control method may be applied to the access control device 120 in the implementation environment shown in FIG. 1. The authentication control method may include the following steps.

Step 201: Detect whether a packet that arrives at an access control device is an authentication start packet, where the authentication start packet is used to start an authentication process of a terminal that sends the authentication start packet.

Step 202: Restrict a rate at which the access control device receives an authentication start packet.

The access control device first temporarily stores a received packet when receiving the packet, and parses a packet header of the packet. The access control device sends the packet to a processing unit (for example, a central processing unit) of the access control device to perform subsequent processing if determining, by parsing the packet header, to receive the packet. Therefore, in the embodiments of the present disclosure, a packet that arrives at an access control device refers to a packet temporarily stored by the access control device, and receiving a packet refers to sending a packet when it is determined that subsequent processing needs to be performed on the packet, for example, forwarding the packet or sending the packet to a processing unit.

In conclusion, according to the authentication control method provided in this embodiment of the present disclosure, it is detected whether a packet that arrives at an access control device is an authentication start packet, and a rate at which the access control device receives an authentication start packet is restricted. The rate at which the authentication start packet is received is restricted to control a quantity of terminals that enter subsequent authentication, which avoids an avalanche effect of wireless authentication caused when an excessively large quantity of terminals enter subsequent authentication simultaneously, and ensures that a terminal that already performs subsequent access authentication currently can complete an entire authentication process smoothly, thereby achieving an effect of improving system authentication efficiency.

Figure 3A:
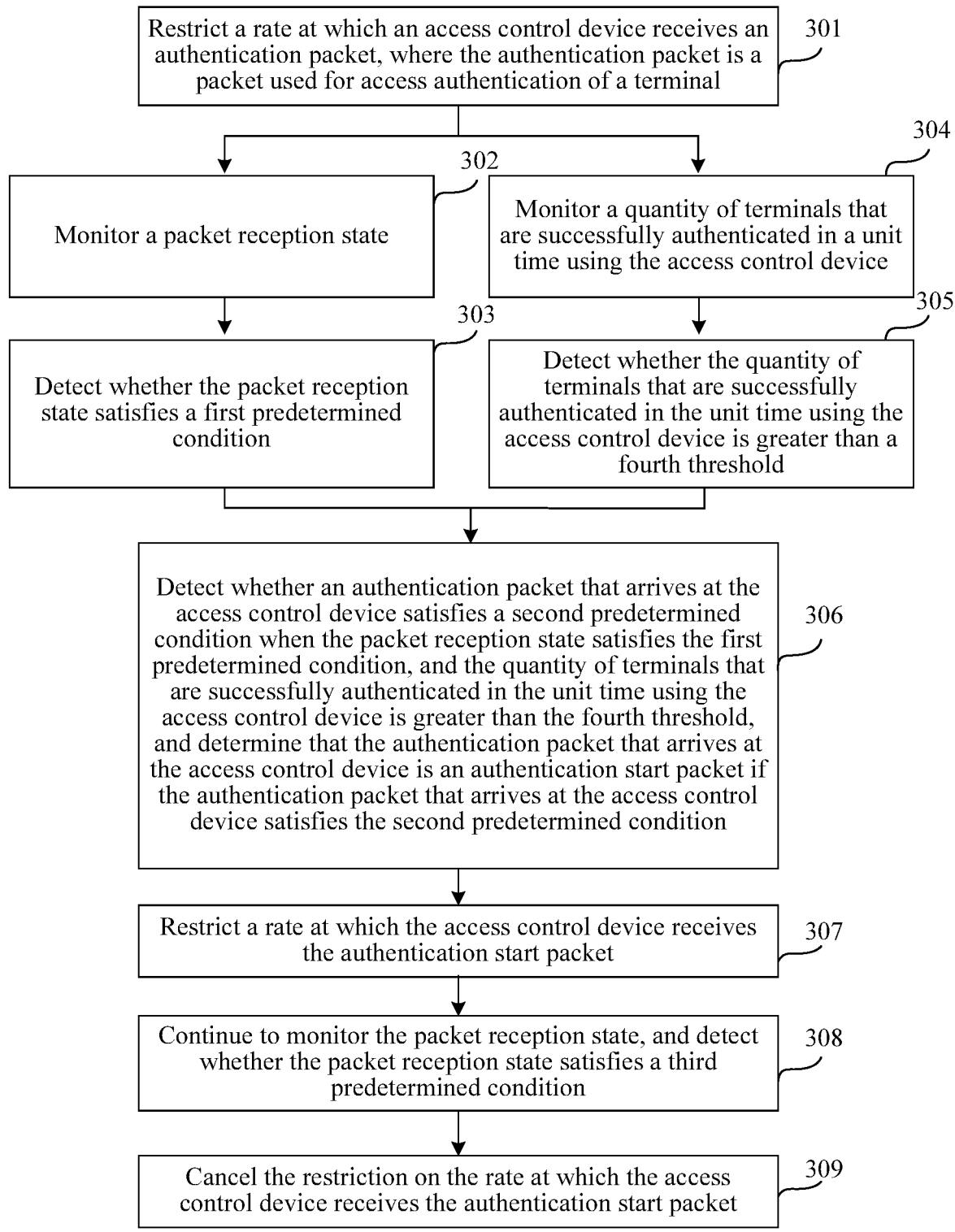
FIG. 3A is a method flowchart of an authentication control method according to another embodiment of the present disclosure.

For a further description of the authentication control method shown in FIG. 2, refer to FIG. 3A, which shows a method flowchart of an authentication control method according to another embodiment of the present disclosure. The authentication control method may be applied to the access control device 120 in the implementation environment shown in FIG. 1. The authentication control method may include the following steps.

Step 301: Restrict a rate at which an access control device receives an authentication packet, where the authentication packet is a packet used for access authentication of a terminal.

In this embodiment of the present disclosure, the access control device first performs overall rate restriction on all to-be-received authentication packets, that is, restricts a rate at which the authentication packets are sent to a processing unit (for example, a central processing unit) of the access control device, to prevent impact on a control plane of the access control device caused by an excessively large quantity of authentication packets.

The access control device may perform overall rate restriction on the to-be-received authentication packets using a token bucket mechanism. A token bucket algorithm is an algorithm that is often used in network traffic shaping and rate restriction. Typically, the token bucket algorithm is used to control the amount of received data and allow sending of burst data.

Step 302: Monitor a packet reception state.

In this embodiment of the present disclosure, the packet reception state may include at least one of a quantity of authentication packets that arrive at the access control device in a unit time, a quantity of authentication packets that are discarded by the access control device in a unit time, or a ratio of a quantity of authentication packets that are discarded by the access control device in a unit time to a quantity of authentication packets that arrive at the access control device in the unit time.

Step 303: Detect whether the packet reception state satisfies a first predetermined condition.

In this embodiment of the present disclosure, the first predetermined condition includes one of the following conditions: the quantity of authentication packets that arrive at the access control device in the unit time is greater than a first threshold, the quantity of authentication packets that are discarded by the access control device in the unit time is greater than a second threshold, or the ratio of the quantity of authentication packets that are discarded by the access control device in the unit time to the quantity of authentication packets that arrive at the access control device in the unit time is greater than a third threshold.

In this embodiment of the present disclosure, to relieve computing burden on the access control device and reduce processing resources, it may be first detected whether the packet reception state satisfies the first predetermined condition, and it may be considered that a condition for restricting an authentication start packet is satisfied when the packet reception state satisfies the first predetermined condition. The authentication start packet is used to start an authentication process of a terminal that sends the authentication start packet.

The first threshold involved in the first predetermined condition may be set according to a computing capability of the access control device. For example, the first threshold may be set to a largest quantity of authentication packets that can be processed by the access control device in the unit time. Both the second threshold and the third threshold that are involved in the first predetermined condition may be set to 0, or may be respectively set to values greater than 0.

Step 304: Monitor a quantity of terminals that are successfully authenticated in a unit time using the access control device.

Step 305: Detect whether the quantity of terminals that are successfully authenticated in the unit time using the access control device is greater than a fourth threshold.

The unit time in step 304 and step 305 may be the same as or different from the unit time in step 302 and step 303.

In an actual application, because burst data exists, a case in which a large quantity of authentication packets arrive at the access control device or a large quantity of authentication packets are discarded by the access control device when no avalanche effect of wireless authentication occurs may appear. Therefore, it is inaccurate to determine, according to only a quantity of authentication packets that arrive at the access control device or a quantity of authentication packets that are discarded by the access control device, whether an avalanche effect occurs. Therefore, in the solution shown in this embodiment of the present disclosure, in order to improve accuracy of determining, it may further be determined, with reference to the quantity of terminals that are successfully authenticated in the unit time using the access control device, whether an avalanche effect occurs, that is, it is considered that a condition for restricting the rate at which the authentication start packet is received is satisfied only when the quantity of terminals that are successfully authenticated in the unit time using the access control device is greater than the fourth threshold.

Step 306: Detect whether an authentication packet that arrives at the access control device satisfies a second predetermined condition when the packet reception state satisfies the first predetermined condition, and the quantity of terminals that are successfully authenticated in the unit time using the access control device is greater than the fourth threshold, and determine that the authentication packet that arrives at the access control device is an authentication start packet if the authentication packet that arrives at the access control device satisfies the second predetermined condition.

The second predetermined condition is one of the following conditions: a packet type field in an EAP packet is 1 when the authentication packet is the EAP packet, in the EAP packet, a packet type field is 0, a packet body type field is 2, and an authentication type field is 1 when the authentication packet is an EAP packet, in the authentication packet that arrives at the access control device, a ver field is 2, a type field is 1, and a chap field is 0 when the authentication packet is a CHAP packet, or in the authentication packet that arrives at the access control device, a ver field is 2, a type field is 3, and a pap field is 1 when the authentication packet is a PAP packet.

Figure 3B:
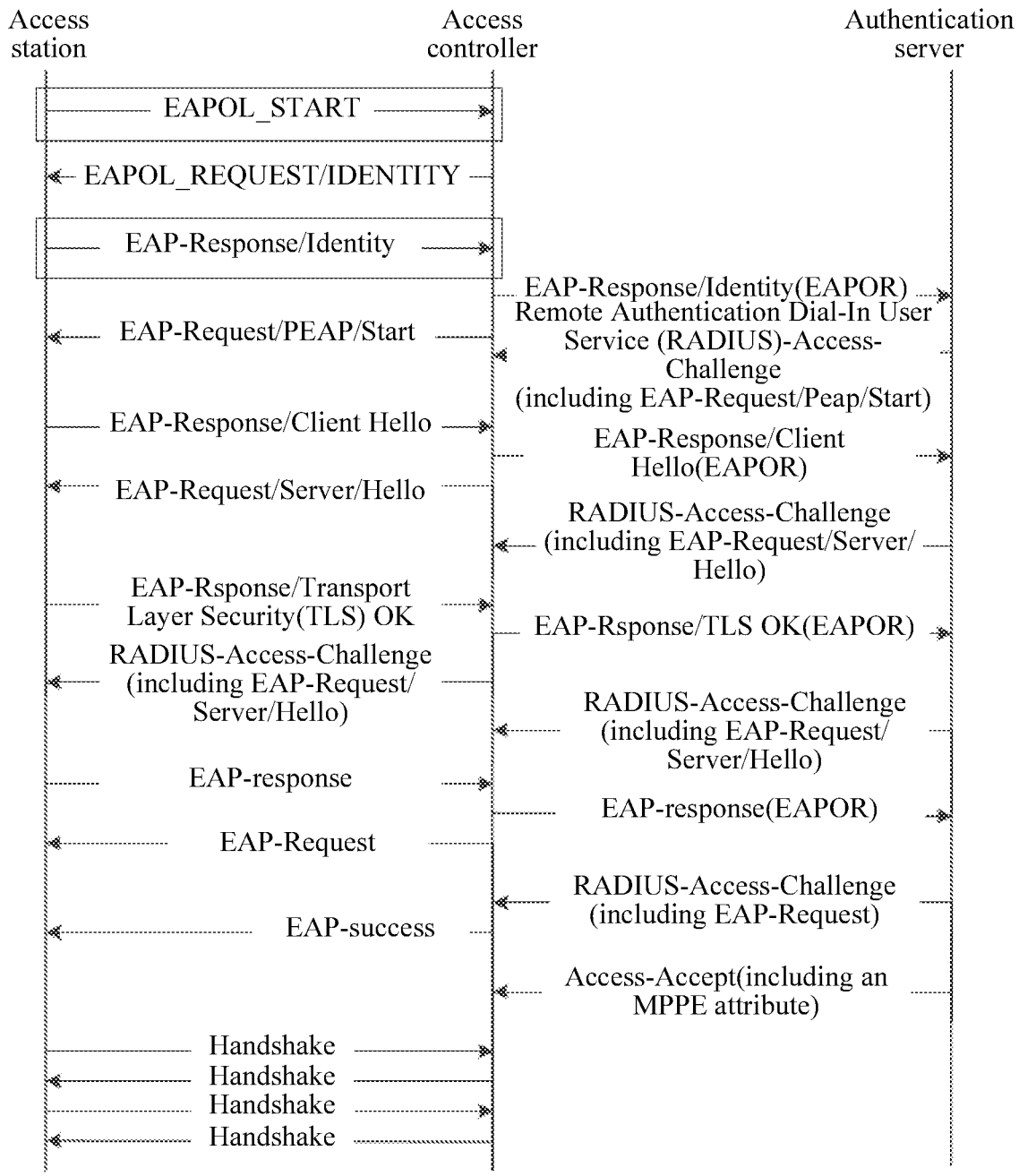
FIG. 3B is an interaction flowchart of EAP authentication according to the embodiment shown in FIG. 3A.
Figure 3C:
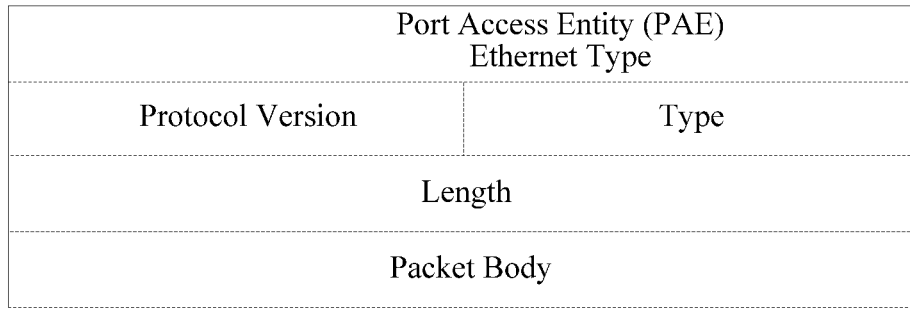
FIG. 3C is a diagram of an encapsulation structure of an EAP packet according to the embodiment shown in FIG. 3A.

For EAP authentication, refer to FIG. 3B to FIG. 3E. FIG. 3B shows an interaction flowchart of EAP authentication. In FIG. 3B, an authentication start packet is an EAP-START packet or an EAP-IDENTITY packet among EAP packets. Refer to FIG. 3C, which shows a diagram of an encapsulation structure of an EAP packet. A Type field in the diagram of the encapsulation structure of the EAP packet is a packet type field in the EAP packet. A value of the packet type field is used to indicate a type of a data frame included in a Packet Body. Values of the packet type field in the EAP packet and data frame types indicated by the values are shown in Table 1.

TABLE 1

| Value | Data frame type |
| --- | --- |
| 0 (0x00) | EAP-Packet: authentication information frame |
| 1 (0x01) | EAPOL-Start: authentication start frame |
| 2 (0x02) | EAPOL-Logoff: disengage request frame |

An EAP-START packet includes an authentication start frame. Therefore, the packet is an EAP-START packet when an authentication packet is an EAP packet, and a packet type field in the EAP packet is 1 (or represented as 0x01).

Figure 3D:
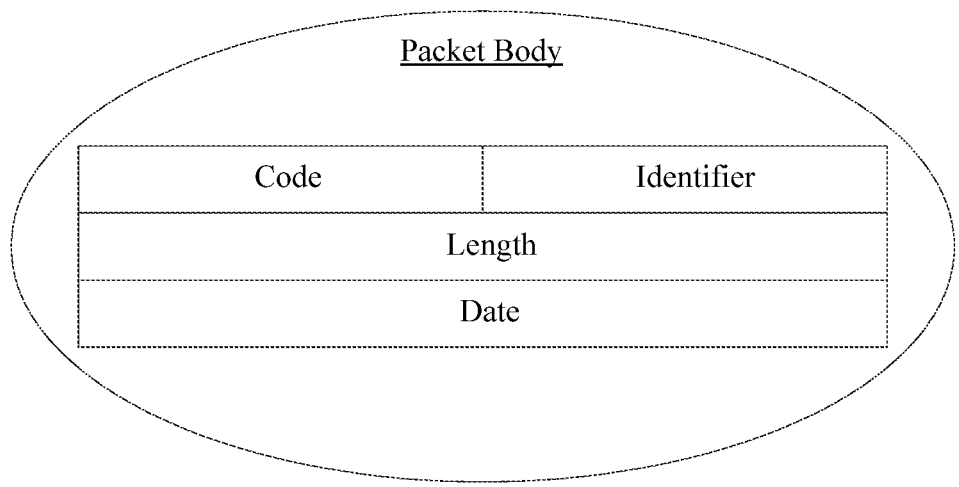
FIG. 3D is a format diagram of a packet body of an EAP packet if a packet type field in the EAP packet is 0 according to the embodiment shown in FIG. 3A.

Refer to FIG. 3D, which shows a format diagram of a packet body of an EAP packet if a packet type field in the EAP packet is 0. A Code field in the packet body is a packet body type field. Values of the packet body type field and packet body types indicated by the values are shown in Table 2.

TABLE 2

| Value | Packet body type |
|---|---|
| 1 | Request: request |
| 2 | Response: response |
| 3 | Success: success |
| 4 | Failure: failure |

Figure 3E:
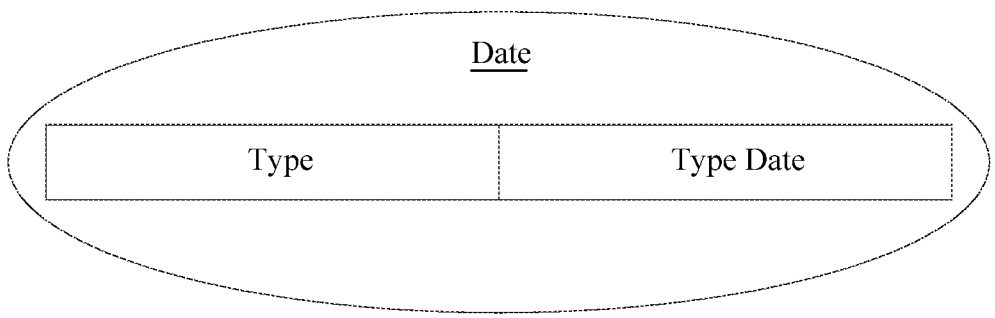
FIG. 3E is a format diagram of a format of a data field in a packet body when a type of the packet body is Request or Response according to the embodiment shown in FIG. 3A.

A format diagram of a format of a data field in the packet body may be shown in FIG. 3E when a type of a packet body is Request or Response. A Type field in the data field is an authentication type field. Values of the authentication type field and authentication types indicated by the values are shown in Table 3.

TABLE 3

| Value | Authentication type |
|---|---|
| 1 | Identifier: query for an identity of a peer end |
| 2 | Notification: alarm or prompt |
| ... | ... |

An EAP-IDENTITY (identity) packet includes an authentication information frame, and a packet body type of the EAP-IDENTITY packet is Response, and an authentication type of the EAP-IDENTITY packet is Identifier. Therefore, when an authentication packet is an EAP packet, a packet type field in the EAP packet is 0 (or represented as 0x00), a packet body type field is 2, and an authentication type field is 1, the packet is an EAP-IDENTITY packet.

Figure 3F:
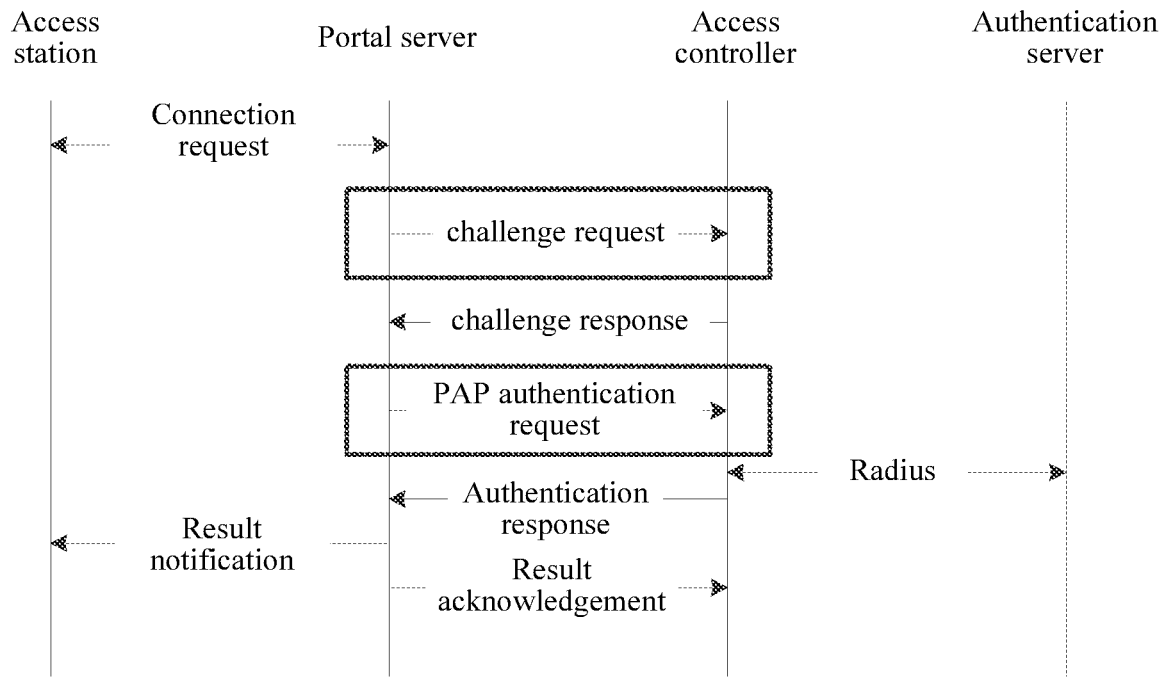
FIG. 3F is an interaction flowchart of captive portal authentication according to the embodiment shown in FIG. 3A.

For captive portal authentication, refer to FIG. 3F, which shows an interaction flowchart of captive portal authentication. A packet that carries captive portal authentication is a User Datagram Protocol (UDP) packet. It may be determined, according to a port number of a UDP packet, that a payload in the UDP packet is a CHAP packet or a PAP packet. In FIG. 3F, an authentication start packet is a CHAP packet (that is, a CHALLENGE request packet) or a PAP authentication request packet. In the CHAP packet, a ver field is 2, a type field is 1, and a chap field is 0 when the CHAP packet is a CHALLENGE request packet. In a PAP packet, a ver field is 2, a type field is 3, and a pap field is 1 when the PAP packet is a PAP authentication request packet.

Step 307: Restrict a rate at which the access control device receives the authentication start packet.

Furthermore, a quantity of authentication start packets that are sent by the access control device to a processing unit in the unit time may be restricted, or a data amount of authentication start packets that are sent by the access control device to a processing unit in the unit time may be restricted when the rate at which the access control device receives the authentication start packet is restricted. The restriction process may also be implemented using a token bucket mechanism, which is not described repeatedly herein.

Step 308: Continue to monitor the packet reception state, and detect whether the packet reception state satisfies a third predetermined condition.

The third predetermined condition being satisfied includes one of the following, the quantity of authentication packets that arrive at the access control device in the unit time is less than a fifth threshold, where the fifth threshold is less than the first threshold, the quantity of authentication packets that are discarded by the access control device in the unit time is less than a sixth threshold, where the sixth threshold is less than the second threshold, or the ratio of the quantity of authentication packets that are discarded by the access control device in the unit time to the quantity of authentication packets that arrive at the access control device in the unit time is less than a seventh threshold, where the seventh threshold is less than the third threshold.

Step 309: Cancel the restriction on the rate at which the access control device receives the authentication start packet.

After the rate at which the access control device receives the authentication start packet is restricted, the packet reception state of the access control device may continue to be monitored. It may be determined that a quantity of terminals that perform access authentication currently is already relatively small when it is found, by monitoring, that the quantity of authentication packets that arrive at the access control device in the unit time decreases below a threshold, or the quantity of authentication packets that are discarded in the unit time decreases below a threshold, or the ratio of the quantity of authentication packets that are discarded in the unit time to the quantity of authentication packets that arrive at the access control device in the unit time decreases below a threshold. In this case, the restriction on the rate at which the access control device receives the authentication start packet may be canceled, to relieve computing burden on the access control device and reduce processing resources.

In conclusion, according to the authentication control method provided in this embodiment of the present disclosure, it is detected whether a packet that arrives at an access control device is an authentication start packet, and a rate at which the access control device receives an authentication start packet is restricted. The rate at which the authentication start packet is received is restricted to control a quantity of terminals that enter subsequent authentication, which avoids an avalanche effect of wireless authentication caused when an excessively large quantity of terminals enter subsequent authentication simultaneously, and ensures that a terminal that already performs subsequent access authentication currently can complete an entire authentication process smoothly, thereby achieving an effect of improving system authentication efficiency.

In addition, according to the authentication control method provided in this embodiment of the present disclosure, a packet reception state is monitored, and the rate at which the access control device receives the authentication start packet is restricted when it is detected that the packet reception state satisfies a first predetermined condition, thereby achieving effects of relieving computing burden on the access control device and reducing processing resources.

In addition, according to the authentication control method provided in this embodiment of the present disclosure, the rate at which the access control device receives the authentication start packet is restricted only when it is detected that a quantity of terminals that are successfully authenticated in a unit time using the access control device is greater than a fourth threshold, thereby achieving effects of improving accuracy of detection and reducing a probability of erroneous detection.

Figure 4:
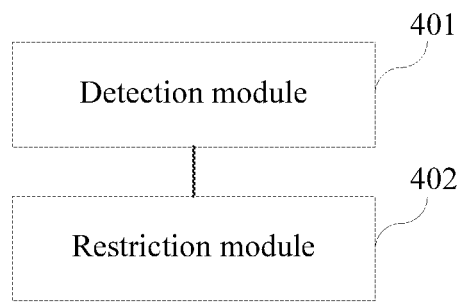
FIG. 4 is a structural diagram of an access control device according to an embodiment of the present disclosure.

Refer to FIG. 4, which shows a structural diagram of an access control device according to an embodiment of the present disclosure. The access control device may be implemented as the access control device 120 in the implementation environment shown in FIG. 1. The access control device may include a detection module 401 configured to detect whether a packet that arrives at the access control device is an authentication start packet, where the authentication start packet is used to start an authentication process of a terminal that sends the authentication start packet, and a restriction module 402 configured to restrict a rate at which the access control device receives an authentication start packet.

In conclusion, according to the access control device provided in this embodiment of the present disclosure, it is detected whether a packet that arrives at the access control device is an authentication start packet, and a rate at which the access control device receives an authentication start packet is restricted. The rate at which the authentication start packet is received is restricted to control a quantity of terminals that enter subsequent authentication, which avoids an avalanche effect of wireless authentication caused when an excessively large quantity of terminals enter subsequent authentication simultaneously, and ensures that a terminal that already performs subsequent access authentication currently can complete an entire authentication process smoothly, thereby achieving an effect of improving system authentication efficiency.

Figure 5:
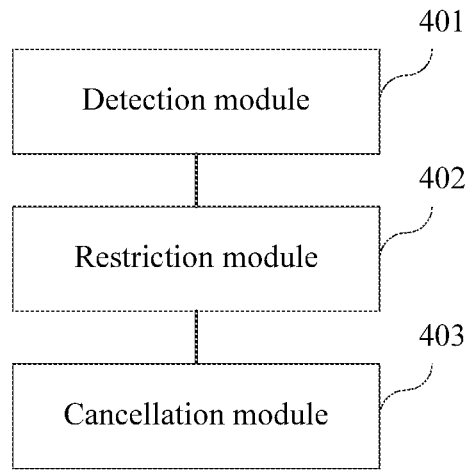
FIG. 5 is a structural diagram of an access control device according to another embodiment of the present disclosure.

For a further description of the authentication control device shown in FIG. 4, refer to FIG. 5, which shows a structural diagram of an access control device according to another embodiment of the present disclosure. The access control device may be implemented as the access control device 120 in the implementation environment shown in FIG. 1. The access control device may include a detection module 401 configured to detect whether a packet that arrives at the access control device is an authentication start packet, where the authentication start packet is used to start an authentication process of a terminal that sends the authentication start packet, and a restriction module 402 configured to restrict a rate at which the access control device receives an authentication start packet.

Optionally, the restriction module 402 is configured to restrict the rate at which the access control device receives the authentication start packet, only when a packet reception state satisfies a first predetermined condition, where the first predetermined condition includes one of the following conditions, a quantity of authentication packets that arrive at the access control device in a unit time is greater than a first threshold, a quantity of authentication packets that are discarded by the access control device in a unit time is greater than a second threshold, or a ratio of a quantity of authentication packets that are discarded by the access control device in a unit time to a quantity of authentication packets that arrive at the access control device in the unit time is greater than a third threshold.

Optionally, the restriction module 402 is configured to restrict the rate at which the access control device receives the authentication start packet, only when a quantity of terminals that are successfully authenticated in the unit time using the access control device is greater than a fourth threshold.

Optionally, the detection module 401 is further configured to detect whether an authentication packet that arrives at the access control device satisfies a second predetermined condition, and determine that the authentication packet that arrives at the access control device is an authentication start packet if the authentication packet that arrives at the access control device satisfies the second predetermined condition, where the second predetermined condition is one of the following conditions, a packet type field in an EAP packet is 1 when the authentication packet is the EAP packet, in the EAP packet, a packet type field is 0, a packet body type field is 2, and an authentication type field is 1 when the authentication packet is an EAP packet, in the authentication packet that arrives at the access control device, a ver field is 2, a type field is 1, and a chap field is 0 when the authentication packet is a CHAP packet, or in the authentication packet that arrives at the access control device, a ver field is 2, a type field is 3, and a pap field is 1 when the authentication packet is a PAP packet.

Optionally, the access control device further includes a cancellation module 403 configured to cancel the restriction performed by the restriction module on the rate at which the access control device receives the authentication start packet when a third predetermined condition is satisfied, where the third predetermined condition being satisfied includes one of the following: the quantity of authentication packets that arrive at the access control device in the unit time is less than a fifth threshold, where the fifth threshold is less than the first threshold, the quantity of authentication packets that are discarded by the access control device in the unit time is less than a sixth threshold, where the sixth threshold is less than the second threshold, or the ratio of the quantity of authentication packets that are discarded by the access control device in the unit time to the quantity of authentication packets that arrive at the access control device in the unit time is less than a seventh threshold, where the seventh threshold is less than the third threshold.

In conclusion, according to the access control device provided in this embodiment of the present disclosure, it is detected whether a packet that arrives at the access control device is an authentication start packet, and a rate at which the access control device receives an authentication start packet is restricted. The rate at which the authentication start packet is received is restricted to control a quantity of terminals that enter subsequent authentication, which avoids an avalanche effect of wireless authentication caused when an excessively large quantity of terminals enter subsequent authentication simultaneously, and ensures that a terminal that already performs subsequent access authentication currently can complete an entire authentication process smoothly, thereby achieving an effect of improving system authentication efficiency.

In addition, according to the access control device provided in this embodiment of the present disclosure, a packet reception state is monitored, and the rate at which the access control device receives the authentication start packet is restricted when it is detected that the packet reception state satisfies a first predetermined condition, thereby achieving effects of relieving computing burden on the access control device and reducing processing resources.

In addition, according to the access control device provided in this embodiment of the present disclosure, the rate at which the access control device receives the authentication start packet is restricted only when it is detected that a quantity of terminals that are successfully authenticated in a unit time using the access control device is greater than a fourth threshold, thereby achieving effects of improving accuracy of detection and reducing a probability of erroneous detection.

Figure 6:
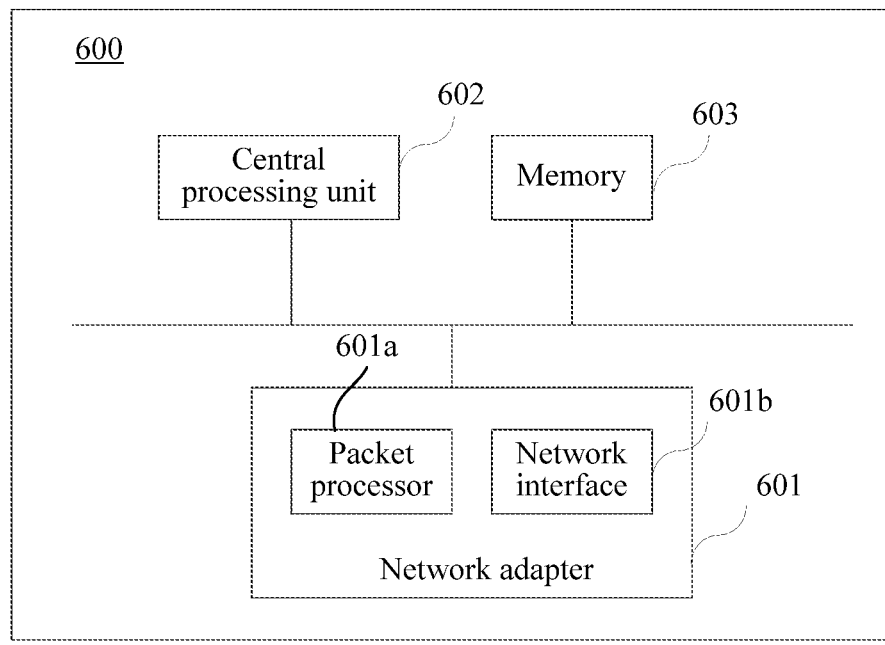
FIG. 6 is a block diagram of a network device according to an embodiment of the present disclosure.

Refer to FIG. 6, which shows a block diagram of a network device according to an embodiment of the present disclosure. A network device 600 may be the foregoing access control device 120 in the network environment shown in FIG. 1. The network device may include a network adapter 601, a central processing unit 602, and a memory 603. The network adapter 601 includes a packet processor 601*a* and a network interface 601*b*. After parsing an authentication packet that arrives at the network device 600, the packet processor 601*a* sends the authentication packet to the central processing unit 602. The central processing unit 602 executes an instruction stored in the memory 603, to process the authentication packet. The network interface 601*b* may include a wired network interface, for example, an Ethernet interface, or may include a wireless network interface.

The packet processor 601a is configured to detect whether a packet that arrives at the network device is an authentication start packet, where the authentication start packet is used to start an authentication process of a terminal that sends the authentication start packet, and the packet processor 601a is configured to restrict a rate at which the network device 600 receives an authentication start packet.

Optionally, the packet processor 601a is configured to restrict the rate at which the network device 600 receives the authentication start packet, only when the central processing unit 602 detects that a packet reception state satisfies a first predetermined condition, where the first predetermined condition includes one of the following conditions, a quantity of authentication packets that arrive at the network device in a unit time is greater than a first threshold, a quantity of authentication packets that are discarded by the network device in a unit time is greater than a second threshold, or a ratio of a quantity of authentication packets that are discarded by the network device in a unit time to a quantity of authentication packets that arrive at the network device in the unit time is greater than a third threshold.

Optionally, the packet processor 601a is configured to restrict the rate at which the network device 600 receives the authentication start packet, only when the central processing unit 602 detects that a quantity of terminals that are successfully authenticated in a unit time using the network device 600 is greater than a fourth threshold.

Optionally, the packet processor 601a is further configured to detect whether an authentication packet that arrives at the network device 600 satisfies a second predetermined condition, and determine that the authentication packet that arrives at the network device 600 is an authentication start packet if the authentication packet that arrives at the network device 600 satisfies the second predetermined condition, where the second predetermined condition is one of the following conditions: a packet type field in an EAP packet is 1 when the authentication packet is the EAP packet, in an EAP packet, a packet type field is 0, a packet body type field is 2, and an authentication type field is 1 when the authentication packet is the EAP packet, in the authentication packet that arrives at the network device 600, a ver field is 2, a type field is 1, and a chap field is 0 when the authentication packet is a UDP packet, or in the authentication packet that arrives at the network device 600, a ver field is 2, a type field is 3, and a pap field is 1 when the authentication packet is a UDP packet.

Optionally, the packet processor 601a is further configured to cancel the restriction on the rate at which the network device 600 receives the authentication start packet when the central processing unit 602 detects that a third predetermined condition is satisfied, where the third predetermined condition being satisfied includes one of the following: the quantity of authentication packets that arrive at the network device in the unit time is less than a fifth threshold, where the fifth threshold is less than the first threshold, the quantity of authentication packets that are discarded by the network device in the unit time is less than a sixth threshold, where the sixth threshold is less than the second threshold, or the ratio of the quantity of authentication packets that are discarded by the network device in the unit time to the quantity of authentication packets that arrive at the network device in the unit time is less than a seventh threshold, where the seventh threshold is less than the third threshold.

In conclusion, it is detected whether a packet that arrives at the network device is an authentication start packet, and a rate at which the network device receives an authentication start packet is restricted when the network device provided in this embodiment of the present disclosure is implemented as an access control device. The rate at which the authentication start packet is received is restricted to control a quantity of terminals that enter subsequent authentication, which avoids an avalanche effect of wireless authentication caused when an excessively large quantity of terminals enter subsequent authentication simultaneously, and ensures that a terminal that already performs subsequent access authentication currently can complete an entire authentication process smoothly, thereby achieving an effect of improving system authentication efficiency.

In addition, a packet reception state is monitored when the network device provided in this embodiment of the present disclosure is implemented as an access control device, and the rate at which the network device receives the authentication start packet is restricted when it is detected that the packet reception state satisfies a first predetermined condition, thereby achieving effects of relieving computing burden on the network device and reducing processing resources.

In addition, the rate at which the network device receives the authentication start packet is restricted only when it is detected that a quantity of terminals that are successfully authenticated in a unit time using the network device is greater than a fourth threshold when the network device provided in this embodiment of the present disclosure is implemented as an access control device, thereby achieving effects of improving accuracy of detection and reducing a probability of erroneous detection.

It should be noted that when the access control device provided in the foregoing embodiments controls an authentication packet, division of the foregoing functional modules is merely used as an example for illustration. In an actual application, the foregoing functions can be allocated to and implemented by different functional modules according to a requirement, that is, an inner structure of the device is divided into different functional modules to implement all or some of the functions described above. In addition, the embodiments of the access control device and the authentication control method that are provided in the foregoing embodiments belong to a same inventive concept, and for details about a specific implementation process, refer to the method embodiments, which are not described repeatedly herein.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc or the like.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network device comprising:
   a central processing unit (CPU);
   a network interface coupled to the CPU; and
   a packet processor coupled to the network interface and the CPU and configured to:
   determine whether a plurality of packets arriving at the network interface are authentication start packets, wherein each authentication start packet is from a separate terminal and is a first packet received in an authentication process to authenticate the separate terminal;
   determine whether a first quantity of terminals successfully authenticated in a unit time using the network device is greater than a first threshold rate; and
   restrict a rate at which the authentication start packets are sent to the CPU to perform further authentication processing when the packets arriving at the network interface are authentication start packets and when the first quantity is greater than the first threshold rate.

2. The network device of claim 1, wherein the packet processor is configured to further restrict the rate when a second quantity of the authentication start packets that arrive at the network interface in a unit time is greater than a second threshold rate.

3. The network device of claim 2, wherein the packet processor is further configured to cancel a restriction on the rate when a fifth quantity of authentication start packets that arrive at the network interface in a unit time is less than a fifth threshold rate, and wherein the fifth threshold rate is less than the second threshold rate.

4. The network device of claim 1, wherein the packet processor is further configured to further restrict the rate when a first ratio of a third quantity of authentication start packets that are discarded by the network device in a unit time to a fourth quantity of the authentication start packets that arrive at the network interface in the unit time is greater than a third threshold rate.

5. The network device of claim 4, wherein the packet processor is further configured to cancel a restriction on the rate when a second ratio of a seventh quantity of authentication start packets that are discarded by the network device in a unit time to an eighth quantity of authentication start packets that arrive at the network interface in the unit time is less than a seventh threshold rate, and wherein the seventh threshold rate is less than the third threshold rate.

6. The network device of claim 1, wherein one of the packets that arrives at the network interface is an extensible authentication protocol (EAP) packet, and wherein the packet processor is further configured to determine that the EAP packet is an authentication start packet when:
   a packet type field in the EAP packet is one; or
   the packet type field in the EAP packet is zero, a packet body type field is two, and an authentication type field is one.

7. The network device of claim 1, wherein the packet processor is further configured to cancel a restriction on the rate when a sixth quantity of authentication start packets that are discarded by the network device in a unit time is less than a sixth threshold rate, and wherein the sixth threshold rate is less than the first threshold rate.

8. The network device of claim 1, wherein the packet processor is configured to determine each packet arriving at the network interface is an authentication start packet when each of the packets arriving at the network interface is a Challenge Handshake Authentication Protocol (CHAP) packet, wherein a ver field in the CHAP packet is 2, a type field is 1, and a CHAP field is 0.

9. The network device of claim 1, wherein the packet processor is further configured to determine that the packets arriving at the network interface are authentication start packets when each of the packets is a Password Authentication Protocol (PAP) packet, and wherein a ver field in the PAP packet is 2, a type field is 3, and a PAP field is 1.

10. The network device of claim 1, wherein the packet processor is further configured to further restrict the rate when a fifth quantity of the authentication start packets that are discarded by the network device in a unit time is greater than a fourth threshold rate.

11. An authentication control method implemented by an access control device, the method comprising:
    making a first determination that a plurality of packets arriving at a network interface are authentication start packets, wherein the access control device comprises the network interface and a central processing unit (CPU), wherein each authentication start packet is from a different terminal and is a first packet received in an authentication process to authenticate the different terminal;
    making a second determination that a first quantity of terminals that are successfully authenticated in a unit time using the access control device is greater than a first threshold rate; and
    restricting, based on the first determination and the second determination, a rate at which the CPU receives the authentication start packets from the network interface to perform further authentication processing.

12. The authentication control method of claim 11, further comprising:
    making a third determination that a second quantity of authentication start packets arriving at the network interface in a unit time is greater than a second threshold rate; and
    further restricting the rate based on the third determination.

13. The authentication control method of claim 12, further comprising:
    making a sixth determination that a sixth quantity of authentication start packets arriving at the network interface in a unit time is less than a fifth threshold rate, wherein the fifth threshold rate is less than the second threshold rate; and
    canceling a restriction on the rate based on the sixth determination.

14. The authentication control method of claim 11, further comprising:
    making a fourth determination that a third quantity of authentication start packets that are discarded by the access control device in a unit time is greater than a third threshold rate; and
    further restricting the rate based on the fourth determination.

15. The authentication control method of claim 14, further comprising:
    making a seventh determination that a seventh quantity of authentication start packets that are discarded by the access control device in a unit time is less than a sixth threshold rate, wherein the sixth threshold rate is less than the third threshold rate; and
    canceling a restriction on the rate based on the seventh determination.

16. The authentication control method of claim 11, further comprising:

making a fifth determination that a first ratio of a fourth quantity of authentication start packets that are discarded by the access control device in a unit time to a fifth quantity of authentication start packets arriving at the network interface in the unit time is greater than a fourth threshold rate; and further restricting the rate based on the fifth determination.

17. The authentication control method of claim 16, further comprising:

making an eighth determination that a second ratio of an eighth quantity of authentication start packets that is discarded by the access control device in a unit time to a ninth quantity of authentication start packets arriving at the network interface in the unit time is less than a seventh threshold rate, wherein the seventh threshold rate is less than the fourth threshold rate; and canceling a restriction on the rate based on the eighth determination.

18. The authentication control method of claim 11, wherein one of the packets arriving at the network interface is an extensible authentication protocol (EAP) packet, and wherein the method further comprises determining that the EAP packet is an authentication start packet when:

a packet type field in the EAP packet is 1, or the packet type field in the EAP packet is 0, a packet body type field is 2, and an authentication type field is 1.

19. The authentication control method of claim 11, wherein determining each packet that arrives at the network interface is an authentication start packet in response when each of the packets that arrives at the network interface is a Challenge Handshake Authentication Protocol (CHAP) packet, and wherein a ver field in the CHAP packet is 2, a type field is 1, and a CHAP field is 0.

20. The authentication control method of claim 11, further comprising further making the first determination when each of the packets is a Password Authentication Protocol (PAP) packet, and wherein a ver field in the PAP packet is 2, a type field is 3, and a PAP field is 1.

* * * * *